(12) United States Patent
Nallampatti Ekambaram et al.

(10) Patent No.: US 10,863,343 B2
(45) Date of Patent: Dec. 8, 2020

(54) INFORMATION CENTRIC NETWORK MOBILITY MANAGEMENT

(71) Applicant: Intel Corporation, Santa Clara, CA (US)

(72) Inventors: Venkatesan Nallampatti Ekambaram, Hillsboro, OR (US); Rath Vannithamby, Portland, OR (US); Ravikumar Balakrishnan, Hillsboro, OR (US); Nageen Himayat, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/235,209

(22) Filed: Dec. 28, 2018

(65) Prior Publication Data

US 2019/0141516 A1    May 9, 2019

Related U.S. Application Data

(60) Provisional application No. 62/716,038, filed on Aug. 8, 2018.

(51) Int. Cl.
*H04W 8/14* (2009.01)
*H04W 64/00* (2009.01)
(Continued)

(52) U.S. Cl.
CPC .......... *H04W 8/14* (2013.01); *H04L 41/147* (2013.01); *H04L 45/021* (2013.01);
(Continued)

(58) Field of Classification Search
CPC ....... H04W 8/14; H04W 64/00; H04W 40/20; H04W 40/026; H04L 45/021; H04L 41/147; H04L 41/12; H04L 43/08
See application file for complete search history.

(56) References Cited

U.S. PATENT DOCUMENTS

2013/0039249 A1* 2/2013 Ravindran .......... H04L 67/2842
370/312
2015/0103844 A1* 4/2015 Zhao ................... H04L 45/50
370/410

(Continued)

FOREIGN PATENT DOCUMENTS

WO      2017016494      2/2017

OTHER PUBLICATIONS

"European Application Serial No. 19183498.5, Extended European Search Report dated Aug. 5, 2019", 12 pgs.
(Continued)

*Primary Examiner* — Ajay Cattungal
(74) *Attorney, Agent, or Firm* — Schwegman Lundberg & Woessner, P.A.

(57) ABSTRACT

System and techniques for information centric network (ICN) mobility management are described herein. A packet may be received, at a first network node positioned between a subscriber and a publisher of an ICN, for a second network node. Movement metrics for the second network node may also be received. The packet may then be transmitted to a third network node—selected from a plurality of network nodes based on the movement metrics—for delivery to the second network node.

21 Claims, 7 Drawing Sheets

(51) Int. Cl.
  *H04L 12/24* (2006.01)
  *H04L 12/755* (2013.01)
  *H04W 40/20* (2009.01)
  *H04W 40/02* (2009.01)
  *H04L 12/26* (2006.01)

(52) U.S. Cl.
  CPC ......... *H04W 40/026* (2013.01); *H04W 40/20* (2013.01); *H04W 64/00* (2013.01); *H04L 41/12* (2013.01); *H04L 43/08* (2013.01)

(56) References Cited

U.S. PATENT DOCUMENTS

| | | | | |
|---|---|---|---|---|
| 2015/0117253 | A1* | 4/2015 | Scott | H04L 67/327 370/254 |
| 2015/0120924 | A1* | 4/2015 | Scott | H04L 69/22 709/225 |
| 2015/0215206 | A1* | 7/2015 | Solis | H04L 43/00 370/252 |
| 2016/0277282 | A1* | 9/2016 | Chen | H04L 45/122 |
| 2016/0373336 | A1* | 12/2016 | Chen | H04L 69/22 |
| 2017/0046342 | A1* | 2/2017 | Azgin | H04L 45/748 |
| 2017/0093691 | A1* | 3/2017 | Garcia-Luna-Aceves | H04L 45/122 |
| 2017/0353382 | A1* | 12/2017 | Gupta | H04L 45/28 |
| 2018/0241679 | A1* | 8/2018 | Muscariello | H04L 43/0858 |

OTHER PUBLICATIONS

Azgin, Aytac, "Location-driven Mobility Support Architecture for Information Centric Networks", International Conference on Computing, Networking and Communications (ICNC), IEEE, (Mar. 5, 2018), 905-911.

Farahat, Hesham, "Proactive caching for Producer mobility management in Named Data Networks", 13th International Wireless Communications and Mobile Computing Conference (IWCMC), IEEE, (Jun. 26, 2017), 171-176.

Ravishankar, Ravindran, "Supporting seamless mobility in named data networking", Communications (ICC), 2012 IEEE International Conference on, IEEE, (Jun. 10, 2012), 5854-5869.

* cited by examiner

FIG. 4B
TIME T+1

FIG. 4A
TIME T

INFORMATION CENTRIC NETWORK MOBILITY MANAGEMENT

CLAIM OF PRIORITY

This patent application claims the benefit of priority, under 35 U.S.C. § 119, to U.S. Provisional Application Ser. No. 62/716,038, titled "INFORMATION CENTRIC NETWORK MOBILITY MANAGEMENT" and filed on Aug. 8, 2018, the entirety of which is hereby incorporated by reference herein.

TECHNICAL FIELD

Embodiments described herein generally relate to computer networking and more specifically to information centric network (ICN) mobility management.

BACKGROUND

More and more network devices are operated in highly mobile environments. This mobility may lead to rapid changes in network attachment points (e.g., access points, base stations, etc.) during networking sessions (e.g., while streaming a video, playing a game, delivering sensor data, receiving control instructions, etc.). Thus, a mobile phone or automobile connected device traveling at speed may use tens of network attachment points during a journey.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

ICN is a networking paradigm—several details of which are provided below with respect to FIG. 7—providing benefits to modern communications that have tended to be data centric rather than connection centric. However, ICNs have been primarily designed in the context of fixed networks (e.g., a subscriber is connected to a single and unchanging network element for a communications session, such as an office computer connected via a cable to a switch). Challenges may arise when such a system is deployed for mobile networks (e.g., mobile phones, tablets, autonomous vehicles, etc.). For example, the forwarding information base (FIB) and pending interest table (PIT) data structures tend to be inefficient if the network topology changes. Further subscriber and publisher mobility pose challenges in the transmission and reception of interest and data packets. In static ICN networks the interests are delivered to the network by the subscribers and are forwarded by intermediate nodes based on the FIB until the interest is satisfied (e.g., a data packet is provided or an indication that the data is not available is provided). The publishers transmit back data and it is routed back to the subscriber typically via the same path the interest was obtained based on the PIT. Thus, if the subscriber has moved, it may miss the responding data packet, or may have to provided follow up interests to retrieve the data, possibly causing retransmissions of the data.

When the network is dynamic, the FIB and PIT data structures at time t may contain stale information from the previous time instant that is not relevant at the current instant t. For example, a node might have moved away at time t and is no longer connected to the original local network where the pending interests were valid and hence the PIT is out of date in its current local network. This may lead to inefficient broadcasts and retransmissions that waste resources. Further, due to publisher and subscriber mobility, the FIB information may be outdated—e.g., static FIB routing policies may not hold well in a dynamic environment where an intermediate node or publisher moves to different location, changing the network topology—and the interest or data packets may not timely reach the publisher or subscriber.

Figure 1:
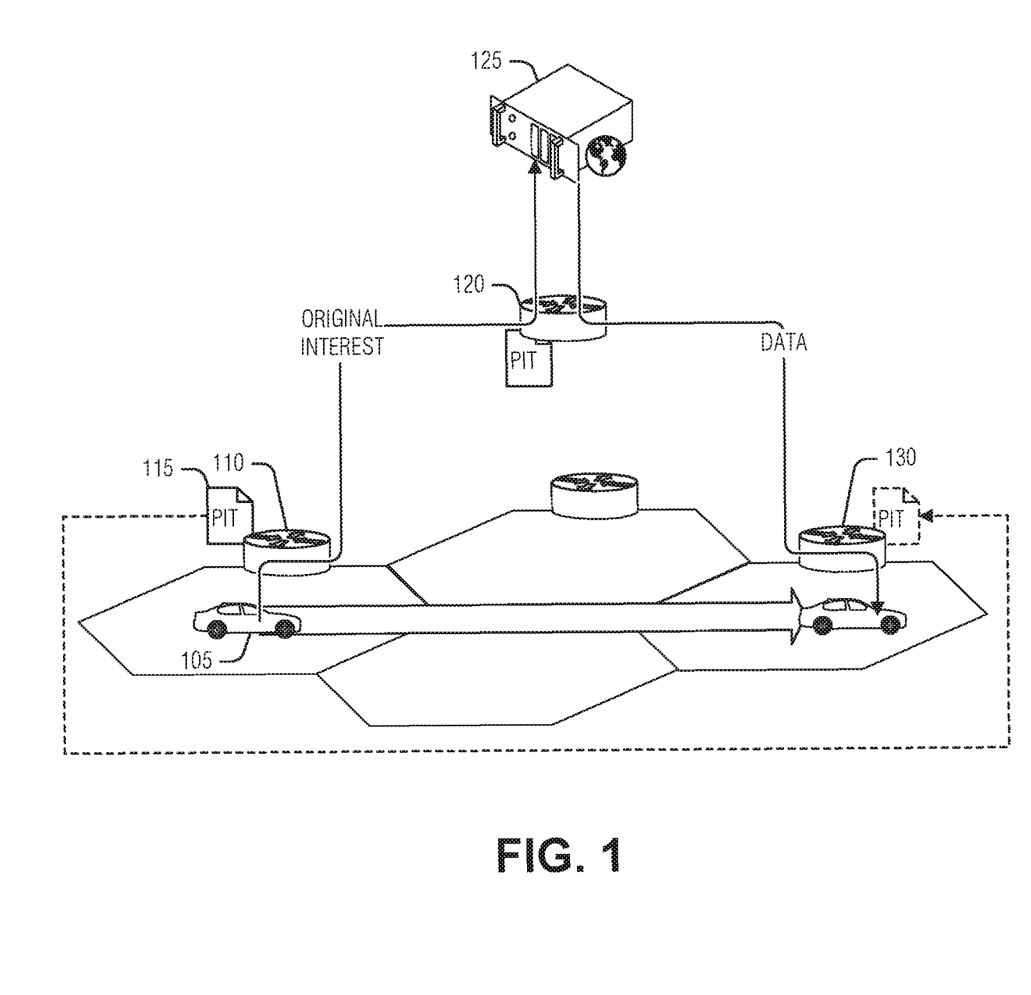
FIG. 1 illustrates an example of an environment to implement ICN mobility, according to an embodiment.

FIG. 1 illustrates an example of an environment to implement ICN mobility, according to an embodiment. The issues of ICN mobility may be addressed by moving ICN node information in anticipation of, or in response to, mobile subscribers or publishers. For example, the physical layer may have information on the mobility of a node 105 as well as its neighbors. This may be accomplished either through messages obtained from the neighbors (e.g., the basic safety messages (BSMs) in dedicated short-range communications (DSRC) for connected vehicles specifies that the vehicle positions are broadcast periodically to adjacent neighbors) or through movement prediction based on sensors (e.g., cameras, inertial sensors, or other inputs). This information may be used to route the interests and data packets or change the beamforming directions at the physical layer. In an example, a virtual beam transfer technique may be employed that transfers the PIT 115 and FIB data structures from an initial connecting node 110 to a connecting node 130, or at least entries in each corresponding to a mobile subscriber 105 or publisher 125, in the direction of motion. A higher level node 120 may also be updated to illustrate the transfer of the PIT 115. In an example, PIT entries may be duplicated at a different node that may likely pass or forward data for the pending interest. This address node mobility uncertainty and enables the network to robustly handle probabilistic node movements. Further, the mobility information may be use to set expiration timers for PIT entries, freeing the network from storing redundant PIT entries lengthy periods. These techniques improve data transfer efficiency of ICN in mobile settings, mitigating some of the issues that mobile networks pose for ICN. Cross-layer optimization by integrating the physical layer information for ICN networks reduces the frequency of FIB and PIT updates in the mobile setting.

Figure 2:
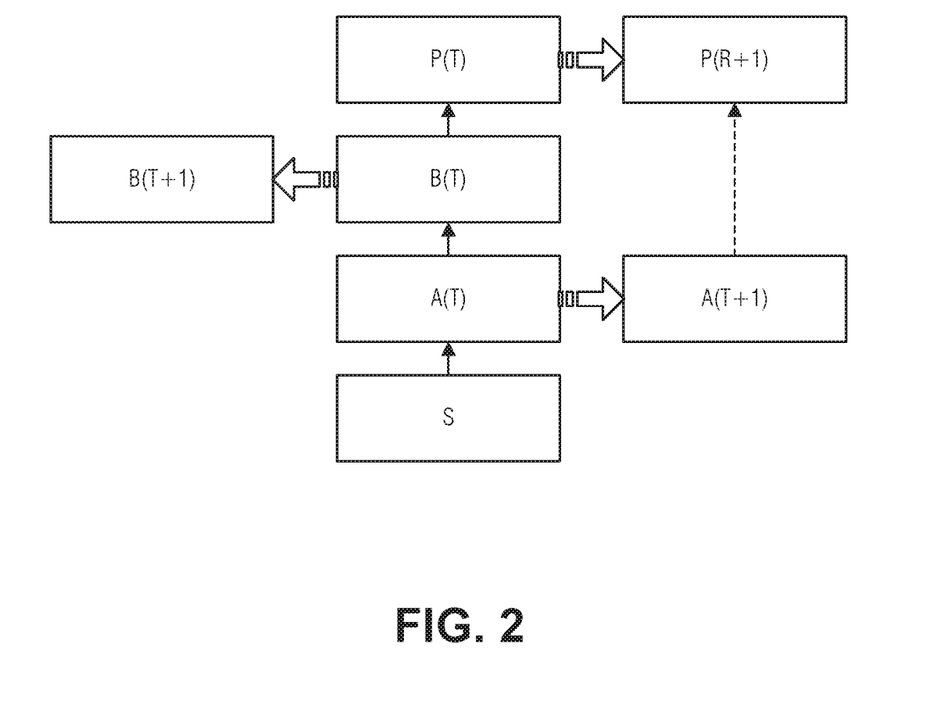
FIG. 2 illustrates an example of relative movement in time of a subscriber, network elements, and a publisher, according to an embodiment.

FIG. 2 illustrates an example of relative movement in time of a subscriber, network elements, and a publisher, according to an embodiment. The three main components that form the backbone of an ICN are interest packets by subscribers, data packets by publishers, and the PIT and FIB data structures stored at intermediate nodes. Not only is the mobility of a subscriber possible, but it is possible that the publisher moves in the duration when an interest packet is introduced in the network. For example, a cloud service querying a camera on an automobile places the automobile in the publisher role. In such a case, the nodes in the neighborhood of the publisher may predict the motion of the publisher. In an example, the interest packet may be beamformed (e.g., sent via a directed radio frequency signal) in the direction of motion of the publisher. This may be carried out in a predetermined manner through predictions though out the network.

Illustrated in FIG. 2 is a small example of device mobility in time t. Here, Subscriber S transmits an interest packet to Node A at time t. Now at time t, Node B is closest to the Publisher P. In this scenario, Node A would use the solid arrows to route an interest packet to the Publisher P. However, at t+1, Node A is closer to the Publisher P because of its motion. Assuming that Nodes A and B have predictions of the mobilities of the nodes in the network, Node A will transmit the interest packet by beamforming in the direction of the Publisher P rather than sending it to Node B, as illustrated with the dashed arrow.

It is possible, for the data packet, that the return path is the same (e.g., not different) if the Subscriber S is not in the transmit region of Node A. The relative motion may be considered as if the Subscriber S is in motion. An alternative approach to deal with publisher mobility, includes Node A updating its forwarding rules in the FIB such that the likelihood of reaching the Publisher P is increased. This may result in greater network efficiency as well as reduction in un-timely delivery of interest packet to the Publisher. The cross-layer optimization works in several ways. For example, the predictive motion model may be used to change the forwarding decision of Node A, and may again be used at the physical layer to change the beam direction to accomplish packet delivery.

Figure 3:
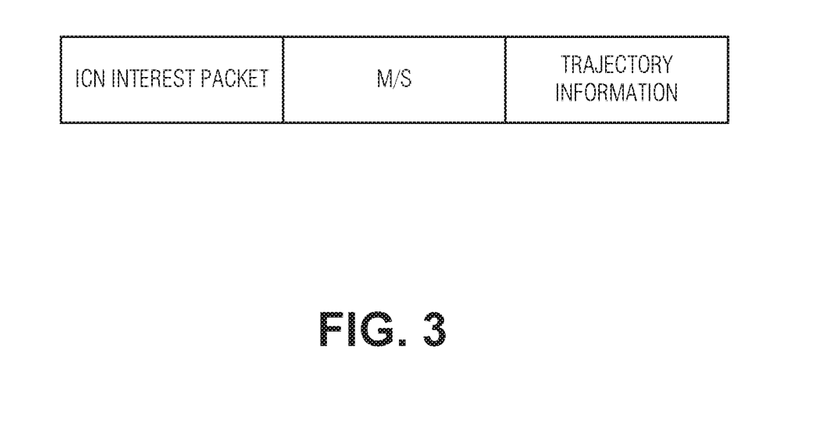
FIG. 3 illustrates an example of a mobility capable interest packet, according to an embodiment.

FIG. 3 illustrates an example of a mobility capable interest packet, according to an embodiment. An additional set of fields may be defined as part of the interest packet to identify mobile subscribers as opposed to stationary subscribers. For example, the M/S field in the illustrated packet indicates whether this is an ICN packet that corresponds to a mobile subscriber. Further, it is it a mobile subscriber, the packet may also include the future trajectory information. Upon receiving such an interest packet, the forwarding nodes may set an expiry timer for the PIT table based on the trajectory information. This avoids unnecessary overflow of the PIT table as well as in improves network efficiency by reducing undesired redundancy.

Figure 4A:
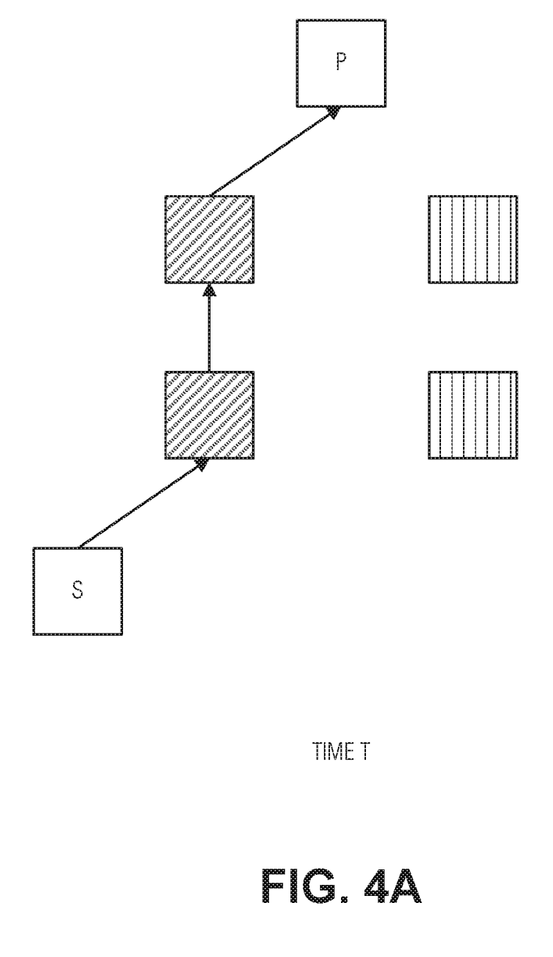
FIGS. 4A-4B illustrate an example of routing in an ICN with a mobile subscriber, according to an embodiment.
Figure 4B:
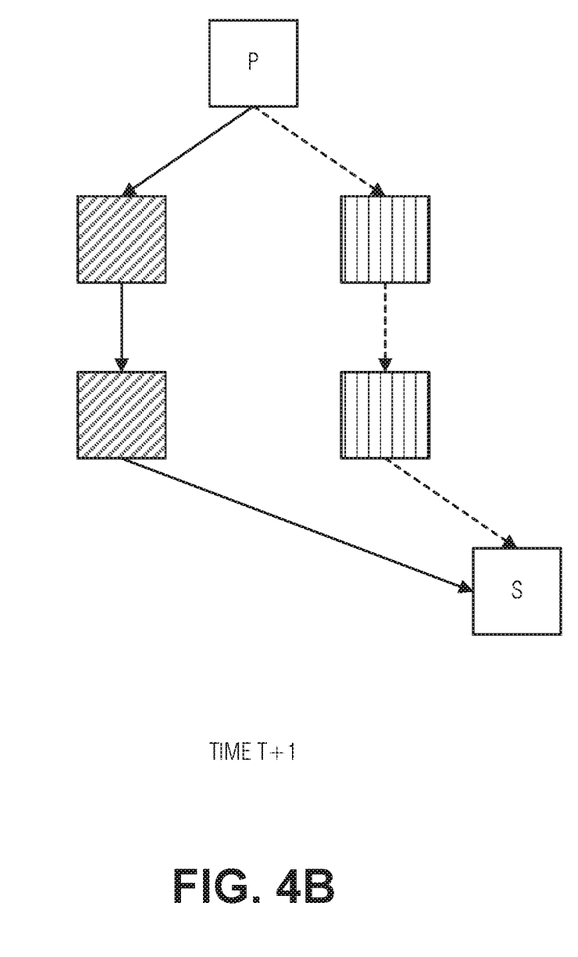

FIGS. 4A-4B illustrate an example of routing in an ICN with a mobile subscriber, according to an embodiment. In a mobile network, after the publisher has received the interest packet, all of the publisher location, the intermediate node locations, and the subscriber location may have changed. Therefore, the path in which the interest packet was received may not be the best path through which to send the data packet. For the illustrated example, at time t (FIG. 4A), the interest packet is routed from the subscriber to the publisher through the diagonally shaded nodes. The PIT and the FIB tables are accordingly updated at these nodes to maintain the pending interest. At time t+1 (FIG. 4B), the publisher and the subscriber have moved. For simplicity, assume that the intermediate nodes are static in this example. In existing ICN techniques, the publisher would route the data packet back through the diagonally shaded nodes (the solid black directional lines) because these have the valid pending interests. As illustrated, however, this may be inefficient because a better path (the dashed directional lines) is through the vertically shaded nodes, which may have a better physical layer channel to the subscriber. In fact, it may be the case that the physical (PHY) connectivity between the last diagonally shaded node and the subscriber is lost or blocked at t+1.

Although the dashed line path through the vertically shaded nodes in FIG. 4B is efficient from the PHY layer perspective, the information routing layer may not allow forwarding of the data packet simply because the nodes do not have any pending interests in their PIT tables and therefore nothing to forward.

Figure 5:
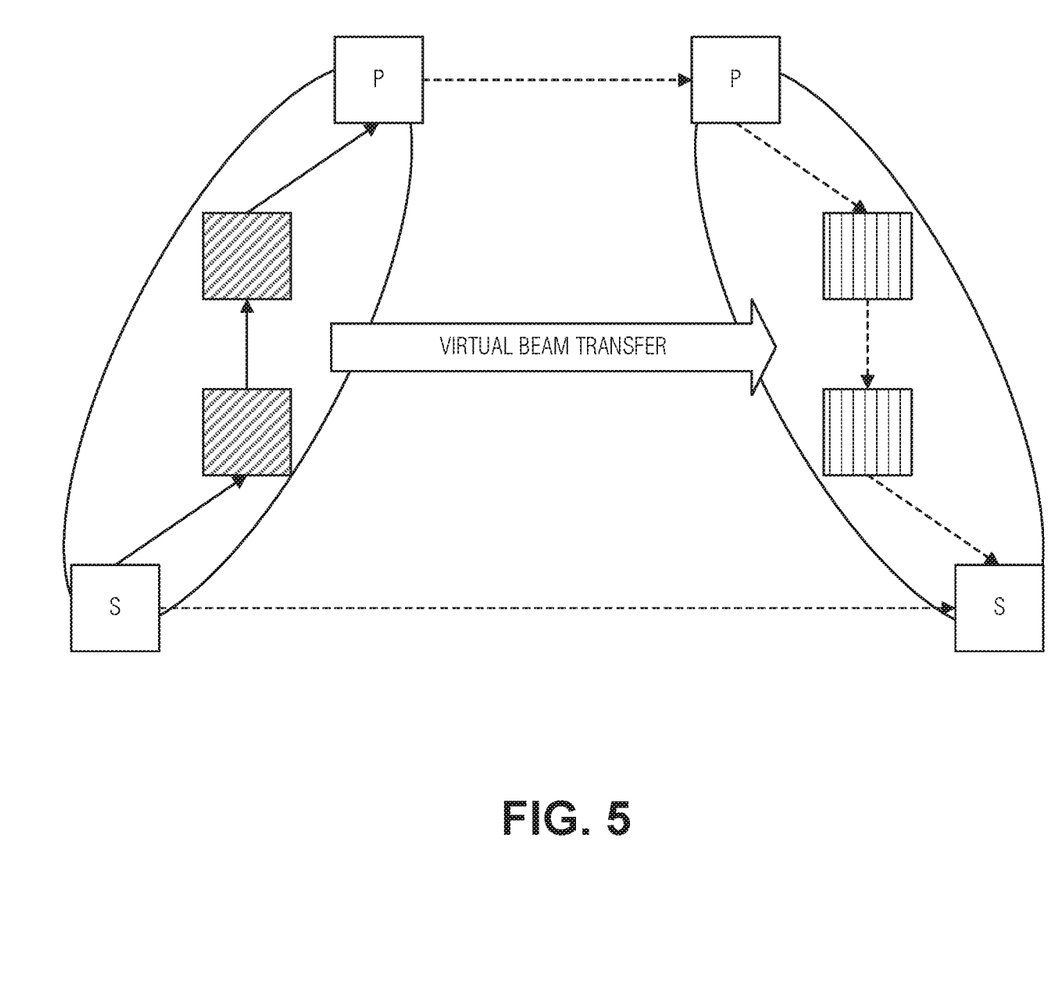
FIG. 5 illustrates an example of network element data transfer for ICN mobility, according to an embodiment.

FIG. 5 illustrates an example of network element data transfer for ICN mobility, according to an embodiment. To mitigate the forwarding problem of FIGS. 4A-4B, a virtual beam transfer technique may be employed. Here, the path between the subscriber and the publisher is considered a virtual beam. The virtual beam contains the PIT and FIB information corresponding to this particular interest. Thus, as the nodes become aware of publisher or subscriber mobility, the nodes may forward the relevant PIT and FIB information in the direction of the motion to enable a better data reception. In this case, the diagonally shaded nodes transfer their PIT and FIB information corresponding to the published interests of the mobile node to the vertically shaded nodes. Thus, publishers are able to send the data back through the dashed path via the vertically shaded nodes. In an example, some of the PHY layer information may be transferred along with the PIT and FIB information. This enables the vertically shaded nodes to better receive the data from the publisher or better transmit the data to the subscriber. Example PHY layer information may include predicted channel coefficients, beam direction, or other parameters to strengthen the connections.

Figure 6:
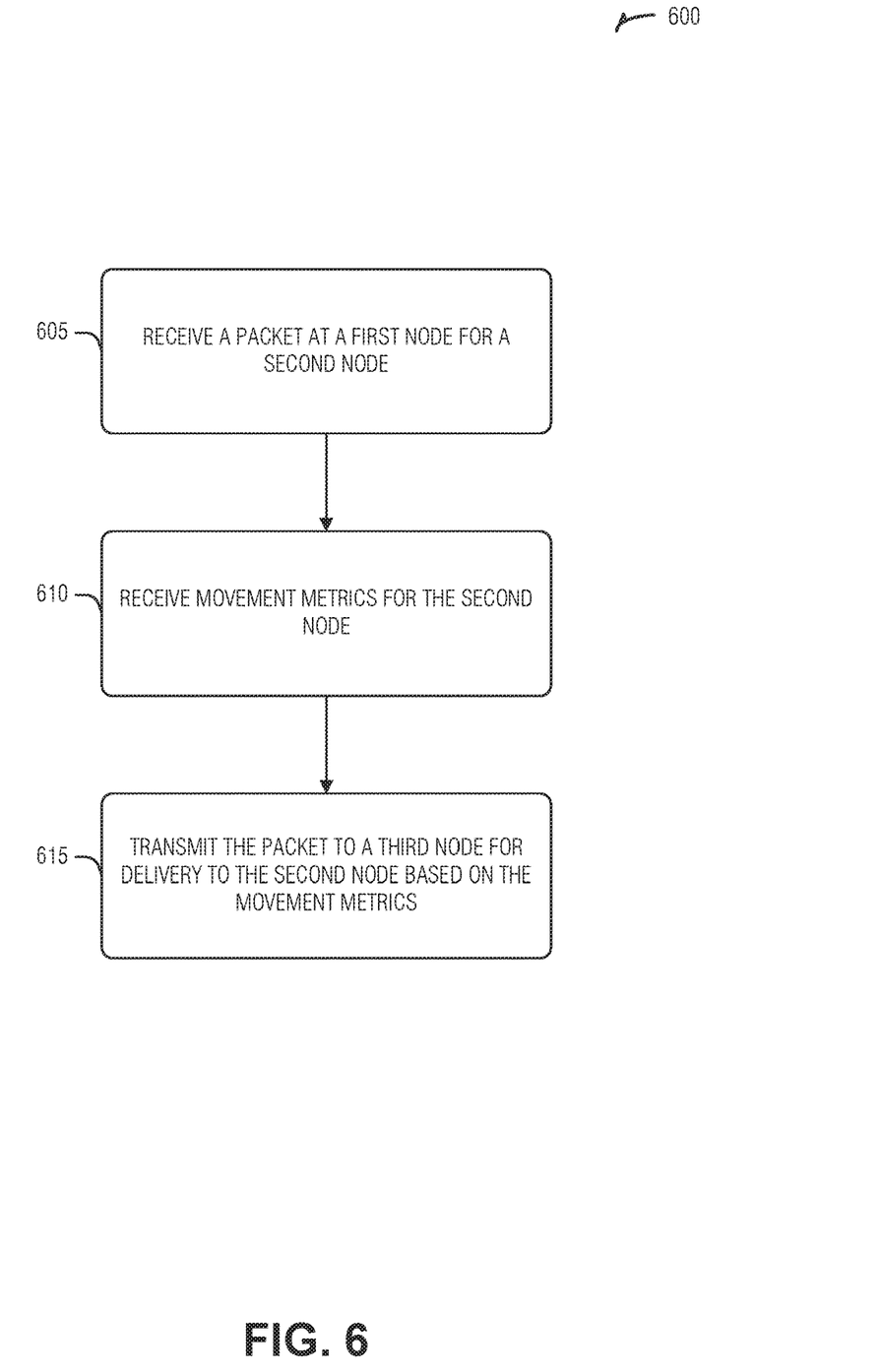
FIG. 6 illustrates a flowchart of an example of a method for ICN mobility management, according to an embodiment.

FIG. 6 illustrates a flowchart of an example of a method 600 for ICN mobility management, according to an embodiment. The operations of the method 600 are performed by computer hardware, such as that described above or below (e.g., processing circuitry).

At operation 605, a packet for a second network node is received at a first network node that is positioned between a subscriber and a publisher of an ICN. In an example, the packet is an interest packet. Here, the second network node is a publisher for data named in the interest packet. Thus, an interest is generated by the subscribed and directed toward the second node, the publisher. In this example, the first network node is an ICN gateway or router that will use its FIB to locate the publisher, or an interim node on the way to the publisher, as well as maintain a PIT entry for the interest packet. In this scenario, publisher mobility is at issue.

In an example, the packet is a data packet in response to an interest packet sent by the second network node, which is a subscriber. In this example, the first network node is an ICN gateway or router that will use its PIT to locate the subscriber, or an interim node on the way to the subscriber. In this scenario, subscriber mobility is at issue because the PIT may be out-of-date if the subscriber moves such that it now connects, or is logically closer, to a third network node.

In an example, the packet includes a mobility field that indicates whether or not a network node (e.g., the second network node) is moving. In an example, the packet includes field for movement metrics. Movement metrics may include a variety of information, including trajectory, velocity, a handover over schedule between ICN gateways, etc.

At operation 610, movement metrics for the second network node are received at the first network node. In an example, the movement metrics include a predicted movement of the second network node. The predicted movement may use a trajectory or velocity of the second network node to predict, as a function of time, where the second network node will be in the future. Simpler metrics may be employed as, for example, input into a predictive classifier (e.g., implemented using an artificial neural network (ANN)) to ascertain, at least, another ICN node that will be logically closer (e.g., fewer network hops) to the second network node in the future. In an example, wireless radio metrics, such as from a base station (e.g., an eNb), may be used. These networks often include sophisticated movement detection to facilitate efficient radio handover between base stations. These handover positions and times may be included in the movement metrics.

In an example, the movement metrics include an expiration for the pending interest based on a predicted trajectory of the second network node. Here, the expiration alerts the first network node that, if a data packet arrives after the expiration, the PIT entry should not be followed (e.g., it has expired). In an example, the first network node expunges PIT entries after the expiration period has elapsed.

In cases where the movement metric has a predicted trajectory, or the first network node computes a predicted trajectory, the first network node may transfer a portion of its FIB to another (e.g., third) network node based the predicted trajectory of the second network node. Moving the FIB, or the PIT, to a node predicted to be in the path of the returning data packet (e.g., sent in response to an interest packet) results in efficient routing of the data packet. By transfer the FIB or the PIT, the third network node operates within the ICN as if the interest traversed the third network node, even though it never did. Because PIT entries and FIB entries may be compact, this transfer may be an efficient operation from a network use perspective.

At operation 615, the packet is transmitted to the third network node for delivery to the second network node. Here, the third network node is selected from a plurality of network nodes based on the movement metrics. As noted above, this selection may be based on a predicted trajectory of the second network node. In an example, when the packet is an interest packet and the second network node is a publisher of the data named in the packet, the FIB of the first network node is modified by the movement metric as part of the transmission. Thus, the FIB is adjusted to reflect that the connecting point to the publisher has changed because of the movement metric. FIB modifications generally cover the publisher mobility scenario. In an example, where the packet is a data packet and the subscriber mobility are implicated, the transmission may include modify the PIT entry in response to movement of the subscriber. Here, the transmission follows the modified PIT entry. Thus, PIT entry adjustments, or transfers to other nodes, based on the movement metric cover the subscriber mobility scenario.

Figure 7:
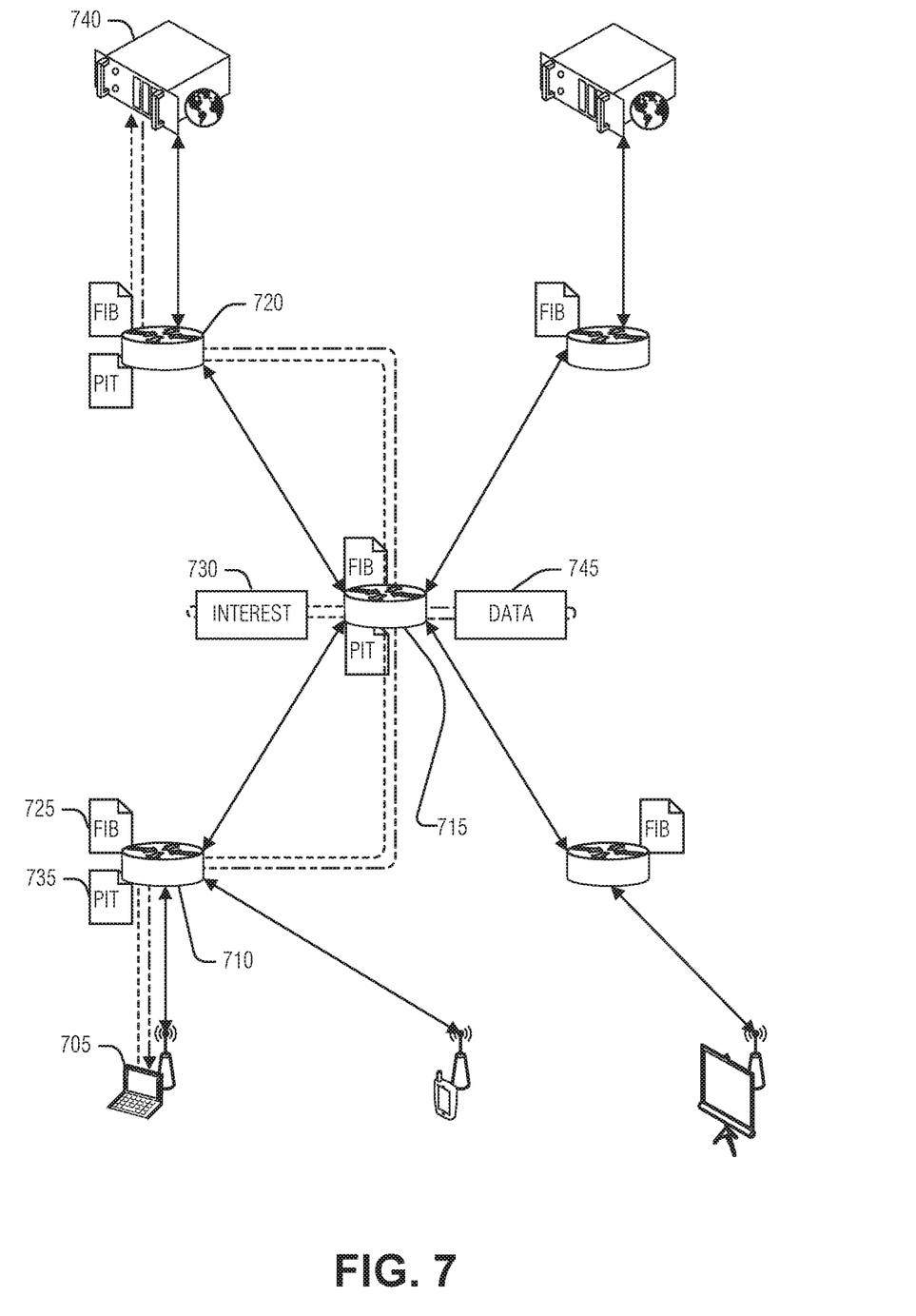
FIG. 7 illustrates an example ICN, according to an embodiment.

FIG. 7 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 705 (e.g., subscriber) requests named content from the network itself. The content request may be called an interest and transmitted via an interest packet 730. As the interest packet 730 traverses network devices (e.g., network elements, routers, switches, hubs, etc.)—such as network elements 710, 715, and 720—a record of the interest is kept, for example, in a pending interest table (PIT) at each network element. Thus, network element 710 maintains an entry in its PIT 735 for the interest packet 730, network element 715 maintains the entry in its PIT, and network element 720 maintains the entry in its PIT.

When a device, such as publisher 740, that has content matching the name in the interest packet 730 is encountered, that device 740 may send a data packet 745 in response to the interest packet 730. Typically, the data packet 745 is tracked back through the network to the source (e.g., device 705) by following the traces of the interest packet 730 left in the network element PITs. Thus, the PIT 735 at each network element establishes a trail back to the subscriber 705 for the data packet 745 to follow.

Matching the named data in an ICN may follow several strategies. Generally, the data is named hierarchically, such as with a universal resource identifier (URI). For example, a video may be named www.somedomain.com/videos/v8675309. Here, the hierarchy may be seen as the publisher, "www.somedomain.com," a sub-category, "videos," and the canonical identification "v8675309." As an interest 7630 traverses the ICN, ICN network elements will generally attempt to match the name to a greatest degree. Thus, if an ICN element has a cached item or route for both "www-.somedomain.com/videos" and "www.somedomain.com/videos/v8675309," the ICN element will match the later for an interest packet 730 specifying "www.somedomain.com/videos/v8675309." In an example, an expression may be used in matching by the ICN device. For example, the interest packet may specify "www.somedomain.com/videos/v8675*" where '*' is a wildcard. Thus, any cached item or route that includes the data other than the wildcard will be matched.

Item matching involves matching the interest 730 to data cached in the ICN element. Thus, for example, if the data 745 named in the interest 730 is cached in network element 715, then the network element 715 will return the data 745 to the subscriber 705 via the network element 710. However, if the data 745 is not cached at network element 715, the network element 715 routes the interest 730 on (e.g., to network element 720). To facilitate routing, the network elements may use a forwarding information base 725 (FIB) to match named data to an interface (e.g., physical port) for the route. Thus, the FIB 725 operates much like a routing table on a traditional network device.

In an example, additional meta-data may be attached to the interest packet 730, the cached data, or the route (e.g., in the FIB 725), to provide an additional level of matching. For example, the data name may be specified as "www.somedomain.com/videos/v8675309," but also include a version number—or timestamp, time range, endorsement, etc. In this example, the interest packet 730 may specify the desired name, the version number, or the version range. The matching may then locate routes or cached data matching the name and perform the additional comparison of meta-data or the like to arrive at an ultimate decision as to whether data or a route matches the interest packet 730 for respectively responding to the interest packet 730 with the data packet 745 or forwarding the interest packet 730.

ICN has advantages over host-based networking because the data segments are individually named. This enables aggressive caching throughout the network as a network element may provide a data packet 730 in response to an interest 730 as easily as an original author 740. Accordingly, it is less likely that the same segment of the network will transmit duplicates of the same data requested by different devices.

Fine grained encryption is another feature of many ICN networks. A typical data packet 745 includes a name for the data that matches the name in the interest packet 730. Further, the data packet 745 includes the requested data and may include additional information to filter similarly named data (e.g., by creation time, expiration time, version, etc.). To address malicious entities providing false information under the same name, the data packet 745 may also encrypt its contents with a publisher key or provide a cryptographic hash of the data and the name. Thus, knowing the key (e.g., from a certificate of an expected publisher 740) enables the recipient to ascertain whether the data is from that publisher 740. This technique also facilitates the aggressive caching of the data packets 745 throughout the network because each data packet 745 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 8:
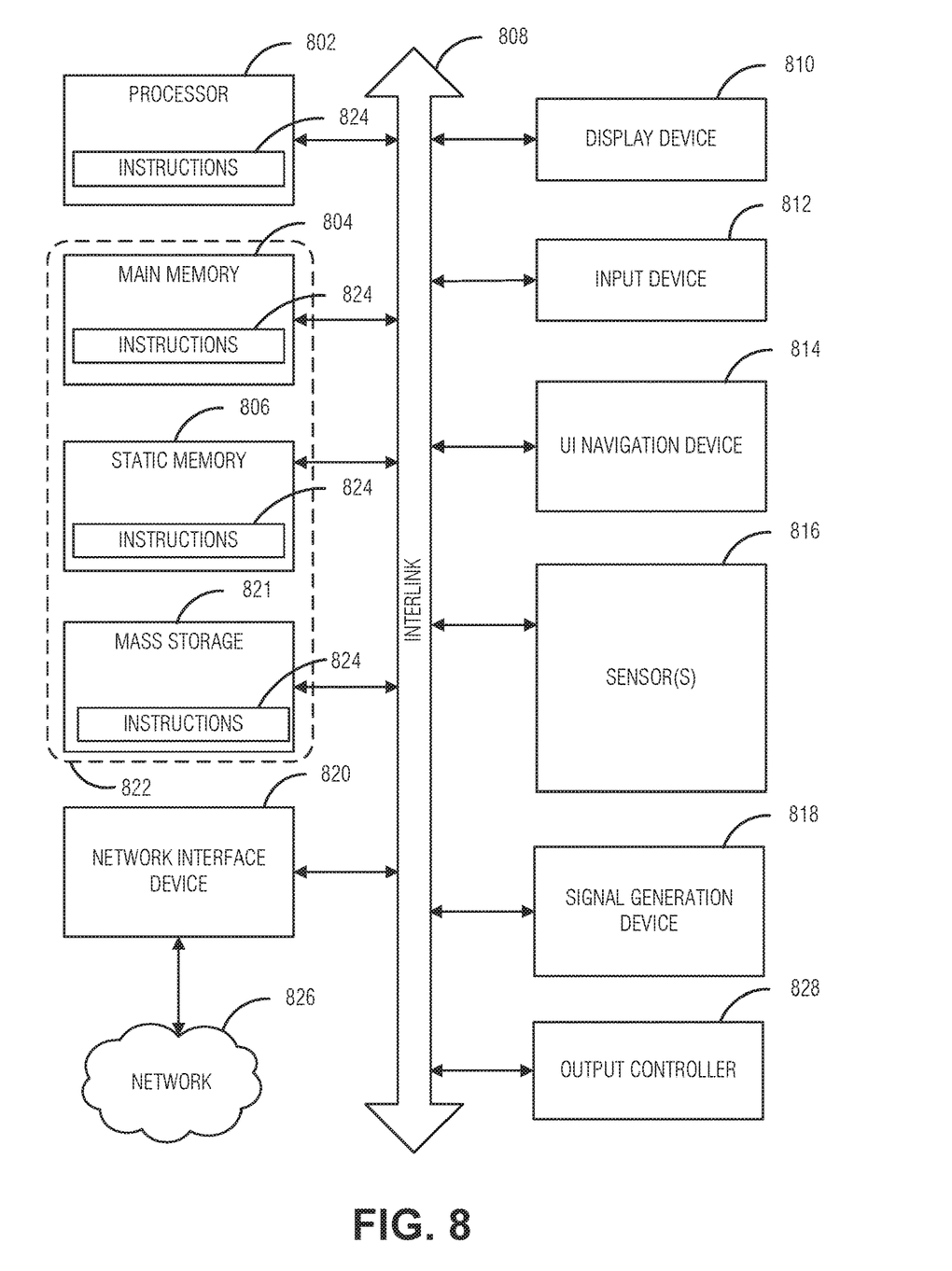
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drive, tape drive, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 822. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 822 may be representative of the instructions 824, such as instructions 824 themselves or a format from which the instructions 824 may be derived. This format from which the instructions 824 may be derived may include source code, encoded instructions (e.g., in compressed or encrypted form), packaged instructions (e.g., split into multiple packages), or the like. The information representative of the instructions 824 in the machine readable medium 822 may be processed by processing circuitry into the instructions to implement any of the operations discussed herein. For example, deriving the instructions 824 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 may include assembly, compilation, or interpretation of the information (e.g., by the processing circuitry) to create the instructions 824 from some intermediate or preprocessed format provided by the machine readable medium 822. The information, when provided in multiple parts, may be combined, unpacked, and modified to create the instructions 824. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

ADDITIONAL NOTES & EXAMPLES

Example 1 is a device for information centric network (ICN) mobility management, the device comprising: memory including instructions; and processing circuitry that, when in operation, is configured by the instructions to: receive, at a first network node positioned between a subscriber and a publisher of an ICN, a packet for a second network node; receive movement metrics for the second network node; and transmit the packet to a third network node for delivery to the second network node, the third network node selected from a plurality of network nodes based on the movement metrics.

In Example 2, the subject matter of Example 1, wherein the packet is an interest packet, and wherein the second network node is a publisher for data named in the interest packet.

In Example 3, the subject matter of Example 2, wherein, to transmit the packet to the third network node, the processing circuitry is configured by the instructions to modify a forwarding information base (FIB) of the first network node by the movement metric.

In Example 4, the subject matter of any of Examples 1-3, wherein the movement metrics include a predicted movement of the second network node.

In Example 5, the subject matter of any of Examples 1-4, wherein the packet is a data packet in response to an interest packet sent by the second network node, the second network node being a subscriber for data named in the interest packet.

In Example 6, the subject matter of Example 5, wherein the movement metrics include a pending interest in a pending interest table (PIT) of the first network node, and wherein, to transmit the packet to the third network node, the processing circuitry is configured by the instructions to follow the pending interest.

In Example 7, the subject matter of Example 6, wherein the movement metrics include an expiration for the pending interest based on a predicted trajectory of the second network node.

In Example 8, the subject matter of Example 7, wherein the movement metrics include the predicted trajectory of the second network node.

In Example 9, the subject matter of any of Examples 7-8, wherein the processing circuitry is configured by the instructions to transfer a portion of a forwarding information base (FIB) of the first network node to the third network node based the predicted trajectory of the second network node.

In Example 10, the subject matter of any of Examples 1-9, wherein the packet includes a mobility field, the mobility field indicating whether or not a network node is moving.

In Example 11, the subject matter of any of Examples 1-10, wherein the packet includes a field for the movement metrics.

Example 12 is a method for information centric network (ICN) mobility management, the method comprising: receiving, at a first network node positioned between a subscriber and a publisher of an ICN, a packet for a second network node; receiving movement metrics for the second network node; and transmitting the packet to a third network node for delivery to the second network node, the third network node selected from a plurality of network nodes based on the movement metrics.

In Example 13, the subject matter of Example 12, wherein the packet is an interest packet, and wherein the second network node is a publisher for data named in the interest packet.

In Example 14, the subject matter of Example 13, wherein transmitting the packet to the third network node includes modifying a forwarding information base (FIB) of the first network node by the movement metric.

In Example 15, the subject matter of any of Examples 12-14, wherein the movement metrics include a predicted movement of the second network node.

In Example 16, the subject matter of any of Examples 12-15, wherein the packet is a data packet in response to an interest packet sent by the second network node, the second network node being a subscriber for data named in the interest packet.

In Example 17, the subject matter of Example 16, wherein the movement metrics include a pending interest in a pending interest table (PIT) of the first network node, and wherein transmitting the packet to the third network node includes following the pending interest.

In Example 18, the subject matter of Example 17, wherein the movement metrics include an expiration for the pending interest based on a predicted trajectory of the second network node.

In Example 19, the subject matter of Example 18, wherein the movement metrics include the predicted trajectory of the second network node.

In Example 20, the subject matter of any of Examples 18-19, comprising transferring a portion of a forwarding information base (FIB) of the first network node to the third network node based the predicted trajectory of the second network node.

In Example 21, the subject matter of any of Examples 12-20, wherein the packet includes a mobility field, the mobility field indicating whether or not a network node is moving.

In Example 22, the subject matter of any of Examples 12-21, wherein the packet includes a field for the movement metrics.

Example 23 is at least one machine readable medium including information representative of instructions for information centric network (ICN) mobility management, the instructions, when executed by processing circuitry, cause the processing circuitry to perform operations comprising: receiving, at a first network node positioned between a subscriber and a publisher of an ICN, a packet for a second network node; receiving movement metrics for the second network node; and transmitting the packet to a third network node for delivery to the second network node, the third network node selected from a plurality of network nodes based on the movement metrics.

In Example 24, the subject matter of Example 23, wherein the packet is an interest packet, and wherein the second network node is a publisher for data named in the interest packet.

In Example 25, the subject matter of Example 24, wherein transmitting the packet to the third network node includes modifying a forwarding information base (FIB) of the first network node by the movement metric.

In Example 26, the subject matter of any of Examples 23-25, wherein the movement metrics include a predicted movement of the second network node.

In Example 27, the subject matter of any of Examples 23-26, wherein the packet is a data packet in response to an interest packet sent by the second network node, the second network node being a subscriber for data named in the interest packet.

In Example 28, the subject matter of Example 27, wherein the movement metrics include a pending interest in a pending interest table (PIT) of the first network node, and wherein transmitting the packet to the third network node includes following the pending interest.

In Example 29, the subject matter of Example 28, wherein the movement metrics include an expiration for the pending interest based on a predicted trajectory of the second network node.

In Example 30, the subject matter of Example 29, wherein the movement metrics include the predicted trajectory of the second network node.

In Example 31, the subject matter of any of Examples 29-30, wherein the operations comprise transferring a portion of a forwarding information base (FIB) of the first network node to the third network node based the predicted trajectory of the second network node.

In Example 32, the subject matter of any of Examples 23-31, wherein the packet includes a mobility field, the mobility field indicating whether or not a network node is moving.

In Example 33, the subject matter of any of Examples 23-32, wherein the packet includes a field for the movement metrics.

Example 34 is a system for information centric network (ICN) mobility management, the system comprising: means for receiving, at a first network node positioned between a subscriber and a publisher of an ICN, a packet for a second network node; means for receiving movement metrics for the second network node; and means for transmitting the packet to a third network node for delivery to the second network node, the third network node selected from a plurality of network nodes based on the movement metrics.

In Example 35, the subject matter of Example 34, wherein the packet is an interest packet, and wherein the second network node is a publisher for data named in the interest packet.

In Example 36, the subject matter of Example 35, wherein the means for transmitting the packet to the third network node include means for modifying a forwarding information base (FIB) of the first network node by the movement metric.

In Example 37, the subject matter of any of Examples 34-36, wherein the movement metrics include a predicted movement of the second network node.

In Example 38, the subject matter of any of Examples 34-37, wherein the packet is a data packet in response to an interest packet sent by the second network node, the second network node being a subscriber for data named in the interest packet.

In Example 39, the subject matter of Example 38, wherein the movement metrics include a pending interest in a pending interest table (PIT) of the first network node, and wherein the means for transmitting the packet to the third network node include means for following the pending interest.

In Example 40, the subject matter of Example 39, wherein the movement metrics include an expiration for the pending interest based on a predicted trajectory of the second network node.

In Example 41, the subject matter of Example 40, wherein the movement metrics include the predicted trajectory of the second network node.

In Example 42, the subject matter of any of Examples 40-41, comprising means for transferring a portion of a forwarding information base (FIB) of the first network node to the third network node based the predicted trajectory of the second network node.

In Example 43, the subject matter of any of Examples 34-42, wherein the packet includes a mobility field, the mobility field indicating whether or not a network node is moving.

In Example 44, the subject matter of any of Examples 34-43, wherein the packet includes a field for the movement metrics.

Example 45 is at least one machine-readable medium including instructions that, when executed by processing circuitry, cause the processing circuitry to perform operations to implement of any of Examples 1-44.

Example 46 is at least one machine-readable storage medium comprising information representative of instructions that, when executed by processing circuitry, cause the processing circuitry to perform the operations of any of Examples 1-44.

Example 47 is an apparatus comprising means to implement of any of Examples 1-44.

Example 48 is a system to implement of any of Examples 1-44.

Example 49 is a method to implement of any of Examples 1-44.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for information centric network (ICN) mobility, management, the device comprising:
memory including instructions; and
processing circuitry that, when in operation, is configured by the instructions to:
receive, at a first network node positioned between a subscriber and a publisher of an ICN, a packet for a second network node;
receive movement metrics for the second network node; and
transmit the packet to a third network node for delivery to the second network node, the third network node selected from a plurality of network nodes based on the movement metrics for the second network node, wherein at least part of pending interest table (PIT) or forwarding information base (FIB) data structures for the ICN are transferred to one or more nodes in a new path that includes the third network node, and wherein the packet is routed in the ICN on the new path that includes the third network node based on a predicted direction of motion of the second network node, the predicted direction of motion being determined from the movement metrics for the second network node.

2. The device of claim 1, wherein the packet is an interest packet, and wherein the second network node is a publisher for data named in the interest packet.

3. The device of claim 2, wherein, to transmit the packet to the third network node, the processing circuitry is configured by the instructions to modify a forwarding information base (FIB) of the first network node by the movement metric.

4. The device of claim 1, wherein the packet is a data packet in response to an interest packet sent by the second network node, the second network node being a subscriber for data named in the interest packet.

5. The device of claim 4, wherein the movement metrics indicate a pending interest in a pending interest table (PIT) of the first network node, and wherein, to transmit the packet to the third network node, the processing circuitry is configured by the instructions to follow the pending interest.

6. The device of claim 5, wherein the movement metrics indicate an expiration for the pending interest based on a predicted trajectory of the second network node.

7. The device of claim 6, wherein the movement metrics indicate the predicted trajectory of the second network node.

8. A method for information centric network (ICN) mobility management, the method comprising:
receiving, at a first network node positioned between a subscriber and a publisher of an ICN, a packet for a second network node;
receiving movement metrics for the second network node; and
transmitting the packet to a third network node for delivery to the second network node, the third network node selected from a plurality of network nodes based on the movement metrics for the second network node,
wherein at least part of pending interest table (PIT) or forwarding information base (FIB) data structures for the ICN are transferred to one or more nodes in a new path that includes the third network node, and
wherein the packet is routed in the ICN on the new path that includes the third network node based on a predicted direction of motion of the second network node, the predicted direction of motion being determined from the movement metrics for the second network node.

9. The method of claim 8, wherein the packet is an interest packet, and wherein the second network node is a publisher for data named in the interest packet.

10. The method of claim 9, wherein transmitting the packet to the third network node includes modifying a forwarding information base (FIB) of the first network node by the movement metric.

11. The method of claim 8, wherein the packet is a data packet in response to an interest packet sent by the second network node, the second network node being a subscriber for data named in the interest packet.

12. The method of claim 11, wherein the movement metrics indicate a pending interest in a pending interest table (PIT) of the first network node, and wherein transmitting the packet to the third network node includes following the pending interest.

13. The method of claim 12, wherein the movement metrics indicate an expiration for the pending interest based on a predicted trajectory of the second network node.

14. The method of claim 13, wherein the movement metrics indicate the predicted trajectory of the second network node.

15. At least one non-transitory machine readable medium including information representative of instructions for information centric network (ICN) mobility management, the instructions, when executed by processing circuitry, cause the processing circuitry to perform operations comprising:
receiving, at a first network node positioned between a subscriber and a publisher of an ICN, a packet for a second network node;
receiving movement metrics for the second network node; and
transmitting the packet to a third network node for delivery to the second network node, the third network node selected from a plurality of network nodes based on the movement metrics for the second network node,
wherein at least part of pending interest table (PIT) or forwarding information base (FIB) data structures for the ICN are transferred to one or more nodes in a new path that includes the third network node, and
wherein the packet is routed in the ICN on the new path that includes the third network node based on a predicted direction of motion of the second network node, the predicted direction of motion being determined from the movement metrics for the second network node.

16. The at least one machine readable medium of claim 15, wherein the packet is an interest packet, and wherein the second network node is a publisher for data named in the interest packet.

17. The at least one machine readable medium of claim 16, wherein transmitting the packet to the third network node includes modifying a forwarding information base (FIB) of the first network node by the movement metric.

18. The at least one machine readable medium of claim 15, wherein the packet is a data packet in response to an interest packet sent by the second network node, the second network node being a subscriber for data named in the interest packet.

19. The at least one machine readable medium of claim 18, wherein the movement metrics indicate a pending interest in a pending interest table (PIT) of the first network node, and wherein transmitting the packet to the third network node includes following the pending interest.

20. The at least one machine readable medium of claim 19, wherein the movement metrics indicate an expiration for the pending interest based on a predicted trajectory of the second network node.

21. The at least one machine readable medium of claim 20, wherein the movement metrics indicate the predicted trajectory of the second network node.

* * * * *

UNITED STATES PATENT AND TRADEMARK OFFICE
CERTIFICATE OF CORRECTION

| | | |
|---|---|---|
| PATENT NO. | : 10,863,343 B2 | Page 1 of 1 |
| APPLICATION NO. | : 16/235209 | |
| DATED | : December 8, 2020 | |
| INVENTOR(S) | : Nallampatti Ekambaram et al. | |

It is certified that error appears in the above-identified patent and that said Letters Patent is hereby corrected as shown below:

In the Claims

In Column 14, Lines 44-45, in Claim 1, delete "mobility," and insert --mobility-- therefor Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*